W. H. COOLEY & H. E. MARKS.
SECTIONAL TUBULAR HANDLE FOR TOOLS.
APPLICATION FILED JUNE 27, 1907.
914,552.
Patented Mar. 9, 1909.
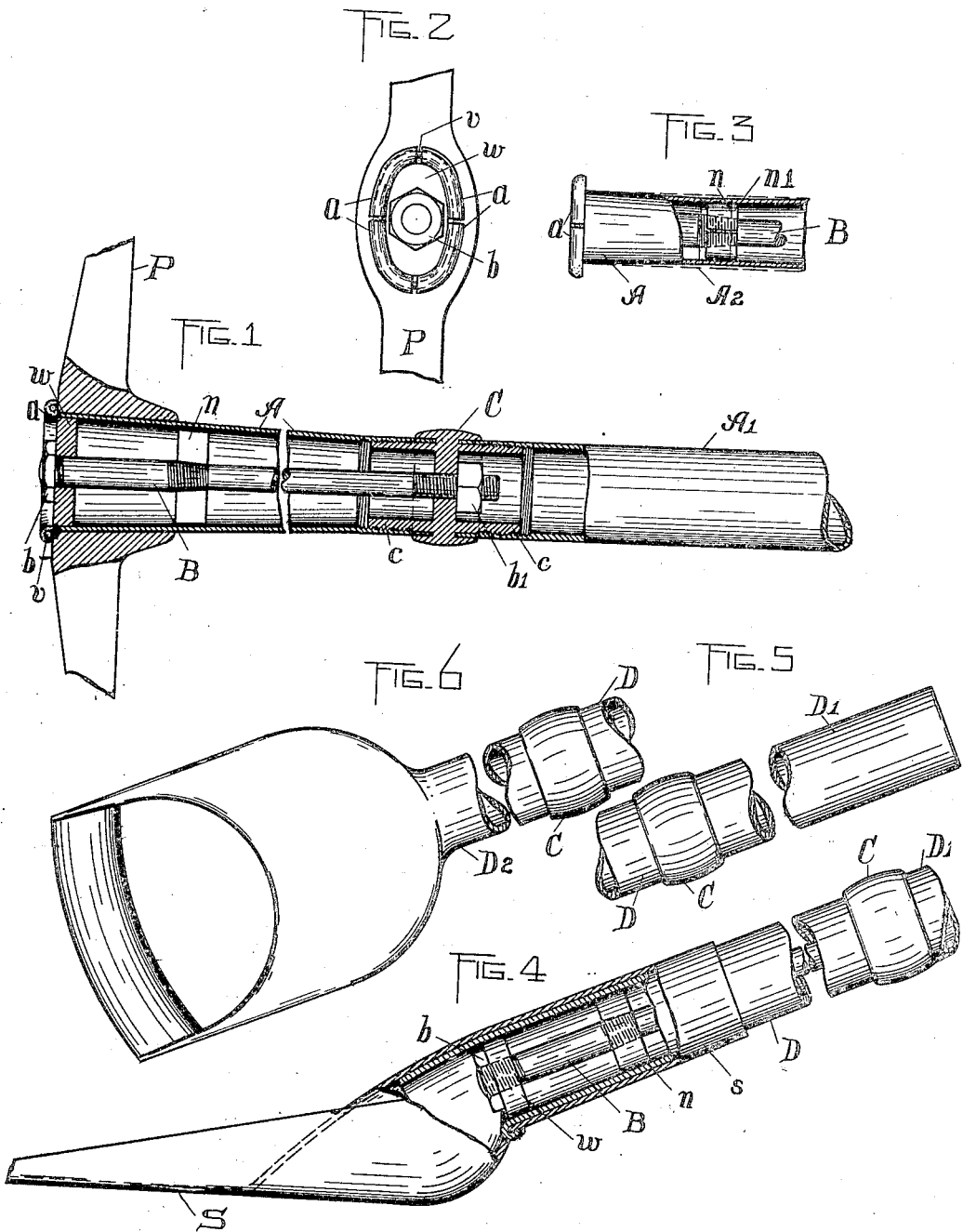

UNITED STATES PATENT OFFICE.

WILLIAM H. COOLEY, OF BROCKPORT, AND HERBERT E. MARKS, OF POUGHKEEPSIE, NEW YORK.

SECTIONAL TUBULAR HANDLE FOR TOOLS.

No. 914,552.        Specification of Letters Patent.        Patented March 9, 1909.

Application filed June 27, 1907. Serial No. 381,062.

*To all whom it may concern:*

Be it known that we, WILLIAM H. COOLEY and HERBERT E. MARKS, citizens of the United States, and residents, respectively, of Brockport, Monroe county, and Poughkeepsie, Dutchess county, State of New York, have invented a new and Improved Sectional Tubular Handle for Tools, of which the following is a specification.

This invention relates to handles for picks, hammers and other like tools, the object being to provide a tubular metallic handle for such tools and means whereby such a handle may be readily inserted and secured within the eye of the tool.

Another object is to provide means whereby the handle may be formed in sections with the parts thereof effectually and economically secured together and with the parts of the handle making a threaded connection with a member operating to secure the handle in the tool.

The accompanying drawings illustrating our invention are as follows:—

Figure 1 is a side view of a pick with a handle inserted and secured in place therein, such handle and pick shown partially in section. Fig. 2 is an end view, as seen from the left, of the parts shown in Fig. 1. Fig. 3 is a side view of the left hand portion of the handle seen in Fig. 1 shown partially in section, the plane of the section, however, being at right angles to the plane of the section shown in Fig. 1. Fig. 4 shows in a view quite similar to Fig. 1 a modification of our handle adapted to use with shovels, while Figs. 5 and 6 show different styles of the detachable or extension portion of such a handle, for use with shovels.

Similar letters refer to similar parts throughout the several views.

Referring to Figs. 1, 2 and 3,—P is the pick, shown partially in vertical section and A is the outer member of the handle comprising a conically formed tubular section, the outer end of which is formed into a bead or roll $a$ which may contain a reinforcing wire $v$ and around which such bead or roll may be formed. The tube A is formed with such a taper as to fit quite closely at its outer end, the eye of the tool. The right hand end of the tube A is internally threaded to receive the externally threaded sleeve $c$ on the coupling C. This coupling C has a central extension grooved outside of the threaded portion $c$ to receive the right hand end of the tube A. Within the tube A there is provided a bolt B enlarged at its left hand end and passing through the wedging washer of disk $w$, preferably of wood or fiber, although metal may be used. This bolt B is tapered at a point just within the inner edge of the eye of the tool and is threaded through a sectional nut $n$, such nut $n$ adapted upon the screwing up of the bolt B to expand in a direction transversely to the plane of Fig. 1, as indicated in Fig. 3, the purpose being to force outwardly and expand the walls of the tube A just within the inner edge of the eye of the tool, and for this purpose the eye of the tool may preferably be slightly tapered, to an extent, however, not perhaps appreciable to the naked eye but sufficiently to produce the necessary wedging action to prevent the tool P from slipping upwardly on the handle. The bolt B extends to the right within the tube A and its extreme right hand end is threaded to receive a nut $b^1$ on the right hand or inner face of the central web of the coupling C.

The method of assembling and the action of the parts thus far described is as follows:—The tube A is inserted through the eye of the tool P and then the bolt B with the sectional nut $n$ thereon is forced into position, substantially such as shown in Fig. 1, but with the bolt B projecting outwardly to the left beyond the outer end of the handle. The washer $w$ is then inserted over the end of the bolt and the nut $b$ screwed down thereon. By properly adjusting the parts, the washer $w$ will be forced to its final position by the bolt B at about the time that the nut $n$ has been sufficiently expanded to force the wall of the tube A outwardly to secure the desired wedging action to prevent the sliding of the tool P upwardly on the handle. At the same time the washer $w$ and nut $n$ will be drawn somewhat together, causing the washer $w$ to firmly wedge within the outer end of the tube A and force the same outwardly firmly against the wall of the eye or socket in the tool P. The coupling member C may then be secured over the right hand end of the bolt B and screwed into place within the tube A, and when firmly screwed to position the nut $b^1$ may be inserted and also screwed firmly up against the web of the coupling C. The outer section of the handle A² may then be screwed into place over the externally threaded collar c on the right hand side of the coupling C. The annular channels provided within the coupling C to receive the ends of the tubes A and A¹ are preferably slightly tapered in order that the ends of the tubes A and A¹ may firmly wedge in such channels to stiffen the handle. The coupling C also provides means for protecting the abutting ends of the tubes A and A¹ besides operating to greatly strengthen the joint.

In Fig. 4 there is shown a method of constructing and arranging the parts of our handle adapted to use with shovels and in which the bolt B performs the functions already clearly set forth and described in relation to that form of our handle seen in Figs. 1, 2 and 3. Beyond the coupling C the shovel may be provided with the usual straight handle D¹ or the usual D-handle D² may be inserted, as seen in Fig. 5. In this form of our handle, the tube D performs substantially the same functions as the tube A in the arrangement seen in Figs. 1, 2 and 3. The tube D¹ performs the function of the straight handle and very similar to that performed by the part A² in Figs. 1, 2 and 3. For this plain tubular handle D¹ there may be substituted the usual D-handle D² when desired, by merely unscrewing the section of the tube D¹ from the coupling C and substituting in place thereof the D-handle internally threaded to engage the coupling C in the manner clearly indicated.

While the handle A may be flattened in the direction of the plane of Fig. 1 at or near the inner edge of the eye of the tool P by compressing the handle at this point in a direction parallel with the plane of Fig. 1, still, we prefer to make use of the construction already above described comprising the nut n and the bolt B. This nut n is, as will be seen in Fig. 1, slightly less in vertical diameter than the internal diameter of the handle A at this point to permit of such compression just above noted, which we prefer to make use of simultaneously with the screwing up of the bolt B in the nut n. By thus compressing the handle A at this point the nut n is more readily expandible in a direction at right angles to the plane of Fig. 1, and forces the handle outward in such direction. This action is more clearly indicated in Fig. 3 where the dotted lines at A³ indicate the handle thus forced outwardly and the position of the nut before being thus screwed up is indicated at n¹.

The method of inserting and using our handle is believed to be sufficiently obvious from the foregoing description to call for no further statement herein.

The shovel S is shown as having the usual handle socket s formed integrally therewith.

What we claim is:—

1. In combination with a tool having an eye therein to receive the handle; a tubular handle for such tool, such handle expanded at or near the inner edge of the eye of the tool in an approximately diametrical line.

2. A tubular handle for a tool having an eye and means for securing the handle in the eye, comprising an expansible internally threaded nut and a tapered bolt adapted to expand such nut outwardly and force the same outwardly within the handle.

3. A tubular handle for a tool having an eye and means for securing the handle in the eye comprising an expansible member located within the tubular handle and co-operating therewith a threaded member adapted on being turned to expand and force the same outwardly within the handle.

4. A tubular handle for a tool having an eye and means for securing the handle in the eye, comprising two members adapted when drawn together to engage the handle on the inside and a bolt adapted to draw such members together and simultaneously expand one of such members outwardly against the handle.

5. In combination with a tool having an eye therein to receive the handle; a tubular handle and means for expanding such handle at or near the inner edge of the eye of the tool in an approximately diametrical direction and correspondingly compressing the handle in a direction approximately at right angles to the direction of such expansion.

6. A tubular handle for a tool having an eye tapered at its inner end and means for securing the handle in the eye of the tool, comprising a member adapted on being moved longitudinally within the handle near the inner end of the eye to force the same outwardly against the eye of the tool and means for moving such member longitudinally within the handle and near the inner end of the eye and for holding the same in place.

WM. H. COOLEY.
HERBERT E. MARKS.

Witnesses:
OSBORNE F. GURNEY,
LOTTIE WOOD.